(12) United States Patent
Seo

(10) Patent No.: US 10,140,949 B2
(45) Date of Patent: Nov. 27, 2018

(54) DISPLAY APPARATUS

(71) Applicant: Samsung Display Co., Ltd., Yongin-Si, Gyeonggi-Do (KR)

(72) Inventor: Hae-kwan Seo, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 13 days.

(21) Appl. No.: 15/391,047

(22) Filed: Dec. 27, 2016

(65) Prior Publication Data

US 2018/0012558 A1    Jan. 11, 2018

(30) Foreign Application Priority Data

Jul. 5, 2016 (KR) .......................... 10-2016-0084986

(51) Int. Cl.
| | |
|---|---|
| *H04B 5/00* | (2006.01) |
| *G09G 5/00* | (2006.01) |
| *G09G 3/20* | (2006.01) |

(52) U.S. Cl.
CPC .......... *G09G 5/003* (2013.01); *G09G 3/2092* (2013.01); *H04B 5/0031* (2013.01); *H04B 5/0037* (2013.01); *H04B 5/0081* (2013.01); *G09G 2300/0426* (2013.01); *G09G 2370/16* (2013.01)

(58) Field of Classification Search
CPC ............... G09G 5/003; G09G 2370/16; G09G 2300/0426; H04B 5/0081; H04B 5/0031; H04B 5/0037
See application file for complete search history.

(56) References Cited

U.S. PATENT DOCUMENTS

| | | | | |
|---|---|---|---|---|
| 2005/0035962 A1* | 2/2005 | Ishibashi | ................ | G09G 3/003 345/419 |
| 2008/0055303 A1* | 3/2008 | Ikeda | ................... | G06F 1/1601 345/214 |
| 2008/0117117 A1* | 5/2008 | Washiro | ............... | H01Q 1/2225 343/850 |
| 2009/0230777 A1* | 9/2009 | Baarman | ................. | H01F 38/14 307/104 |
| 2010/0015918 A1* | 1/2010 | Liu | ......................... | H04B 5/00 455/41.1 |
| 2010/0109445 A1* | 5/2010 | Kurs | ..................... | B60L 11/007 307/104 |

(Continued)

FOREIGN PATENT DOCUMENTS

| | | |
|---|---|---|
| KR | 1020070080426 A | 8/2007 |
| KR | 1020080028679 A | 4/2008 |

(Continued)

*Primary Examiner* — Ibrahim A Khan
(74) *Attorney, Agent, or Firm* — Cantor Colburn LLP

(57) ABSTRACT

A display apparatus includes a printed circuit board including a transmission control unit for outputting input image data, a wireless data generating unit for converting the input image data to a data transmission signal, and a wireless transmission pad unit for wirelessly transmitting the data transmission signal as wireless data, and a display panel having a wireless reception pad unit which is coupled to the wireless transmission pad unit and wirelessly receives the wireless data to output a data reception signal, and a wireless data restoring unit for converting the data reception signal to restored image data.

19 Claims, 11 Drawing Sheets

(56) References Cited

U.S. PATENT DOCUMENTS

| | | | |
|---|---|---|---|
| 2010/0112941 A1* | 5/2010 | Bangs | H04B 5/0012 455/41.1 |
| 2010/0264747 A1* | 10/2010 | Hall | B60L 11/182 307/104 |
| 2011/0050164 A1* | 3/2011 | Partovi | H01F 5/003 320/108 |
| 2011/0106954 A1* | 5/2011 | Chatterjee | G06F 1/1632 709/227 |
| 2011/0217927 A1* | 9/2011 | Ben-Shalom | H02J 7/025 455/41.1 |
| 2013/0005251 A1* | 1/2013 | Soar | H02J 7/025 455/41.1 |
| 2013/0109303 A1* | 5/2013 | McCormack | H04B 1/40 455/39 |
| 2014/0073243 A1* | 3/2014 | Hijioka | H04B 5/0031 455/41.1 |
| 2014/0073270 A1 | 3/2014 | Chou et al. | |
| 2014/0153491 A1* | 6/2014 | Lee | H02J 17/00 370/328 |
| 2014/0155098 A1* | 6/2014 | Markham | H04B 1/0064 455/456.3 |
| 2014/0369170 A1* | 12/2014 | Inha | H04M 1/7253 367/140 |
| 2016/0111887 A1* | 4/2016 | Jeong | H04B 5/0037 307/104 |
| 2016/0292669 A1* | 10/2016 | Tunnell | G06Q 20/3278 |
| 2017/0325328 A1* | 11/2017 | Isaac | H05K 1/0296 |

FOREIGN PATENT DOCUMENTS

| | | |
|---|---|---|
| KR | 1020140046947 A | 4/2014 |
| KR | 1020150143118 A | 12/2015 |

\* cited by examiner

DISPLAY APPARATUS

This application claims priority to Korean Patent Application No. 10-2016-0084986, filed on Jul. 5, 2016, and all the benefits accruing therefrom under 35 U.S.C. § 119, the content of which in its entirety is herein incorporated by reference.

BACKGROUND

1. Field

Exemplary embodiments of the invention herein relate to a display apparatus, and more particularly, to a display apparatus in which a printed circuit board ("PCB") and a display panel are wirelessly connected.

2. Description of the Related Art

Various types of display apparatuses used for multimedia devices such as a television ("TV"), a mobile phone, a tablet computer, a navigation device, and a game machine are being developed. The display apparatuses generally include display panels for displaying an image.

Each of the display apparatuses includes a display panel for displaying an image and a control unit for generating various signals or data for driving the display panel. The control unit may be implemented by various circuits and electronic devices mounted on a printed circuit board ("PCB").

SUMMARY

Exemplary embodiments of the invention provide a display apparatus in which a printed circuit board ("PCB") and a display panel are wirelessly connected.

An exemplary embodiment of the invention provides a display apparatus which includes a printed circuit board including a transmission control unit which outputs input image data, a wireless data generating unit which converts the input image data to a data transmission signal, and a wireless transmission pad unit which wirelessly transmits the data transmission signal as wireless data, and a display panel having a wireless reception pad unit which is coupled to the wireless transmission pad unit and wirelessly receives the wireless data to output a data reception signal, and a wireless data restoring unit which converts the data reception signal to restored image data.

In an exemplary embodiment, the wireless reception pad unit may overlap the wireless transmission pad unit in a thickness direction.

In an exemplary embodiment, the display panel may further include a data driver which converts the restored image data to a data voltage, and a pixel which receives the data voltage.

In an exemplary embodiment, the display apparatus may further include a transmission determination unit which detects, as the data transmission signal is provided, a pad current flowing at the wireless transmission pad unit or a pad voltage applied at the wireless transmission pad unit, and determines whether the wireless data is wirelessly transmitted based on the pad current or the pad voltage.

In an exemplary embodiment, when the wireless data is not transmitted wirelessly, the transmission determination unit outputs a retransmission signal to the transmission control unit and the wireless transmission pad unit retransmits the wireless data to the wireless reception pad unit.

In an exemplary embodiment, the transmission control unit may retransmit the input image data based on the retransmission signal, and the wireless data generating unit may convert the retransmitted input image data to the data transmission signal.

In an exemplary embodiment, the display panel may further include a coupling adjusting circuit which controls a resonant frequency of the wireless reception pad unit and to adjust a coupling between the wireless reception pad unit and the wireless transmission pad unit.

In an exemplary embodiment, the PCB may further include a wireless power generating unit which converts an input power to a transmitted power, where the wireless transmission pad unit wirelessly transmits the transmitted power as a wireless power, and the wireless reception pad unit wirelessly receives the wireless power to output a received power, and the display panel may further include a wireless power restoring unit which converts the received power to a restored power.

In an exemplary embodiment, the wireless transmission pad unit may include a data transmission pad which wirelessly transmits the wireless data and a power transmission pad which wirelessly transmits the wireless power, and the wireless reception pad unit may include a data reception pad which is coupled to the data transmission pad and wirelessly receives the wireless data, and a power reception pad which is coupled to the power transmission pad and wirelessly receives the wireless power.

In an exemplary embodiment, the wireless transmission pad unit may include a plurality of transmission pads arranged in one direction, and the wireless reception pad unit may include a plurality of reception pads arranged in the one direction, where the plurality of transmission pads respectively overlap the plurality of reception pads in a thickness direction, and are respectively coupled to the plurality of reception pads.

In an exemplary embodiment, each of the plurality of transmission pads may include a transmission coil, and each of the plurality of reception pads may include a reception coil, where the transmission coil induces an induced current in the reception coil.

In an exemplary embodiment, each of the plurality of transmission pads may include a transmission electrode, and each of the plurality of reception pads may include a reception electrode, where the transmission electrode induces an induced voltage in the reception electrode.

In an exemplary embodiment, the PCB may further include a base circuit board and a circuit device disposed on a bottom surface of the base circuit board, where the wireless transmission pad unit is disposed on a top surface of the base circuit board, and the PCB is disposed below the display panel.

In an exemplary embodiment, the PCB may further include a base circuit board and a circuit device disposed on a top surface of the base circuit board, where the wireless transmission pad unit is disposed on a bottom surface of the base circuit board, and the PCB is disposed above the display panel.

In an exemplary embodiment, the display panel may further include a panel substrate and a data driver disposed on a top surface of the panel substrate and which converts the restored image data to a data voltage, where the data driver is inserted into an opening defined at the PCB.

In an exemplary embodiment, the distance between the base circuit board and the panel substrate in a thickness direction may be less than the thickness of the data driver.

In an exemplary embodiment, the display panel may further include a data driver which converts the restored image data to a data voltage, where the wireless reception pad unit is embedded in the data driver.

In an exemplary embodiment, the display panel may include a display area which displays an image on and a first non-display area spaced apart from the display area in a first direction, the wireless reception pad unit may include a plurality of first reception pads disposed in the first non-display area and arranged in a second direction different from the first direction, and the wireless transmission pad unit may include a plurality of first transmission pads respectively overlapping the plurality of first reception pads in a thickness direction.

In an exemplary embodiment, the display panel may further include a second non-display area spaced apart from the display area in the second direction, the wireless reception pad unit may further include a plurality of second reception pads disposed in the second non-display area and arranged in the first direction, and the wireless transmission pad unit may further include a plurality of second transmission pads respectively overlapping the plurality of second reception pads in the thickness direction.

In an exemplary embodiment, the display panel may include a pixel, where the wireless reception pad unit is formed in the same layer as a source electrode or a gate electrode of a transistor of the pixel.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to describe principles of the invention. In the drawings.

DETAILED DESCRIPTION

Figure 1:
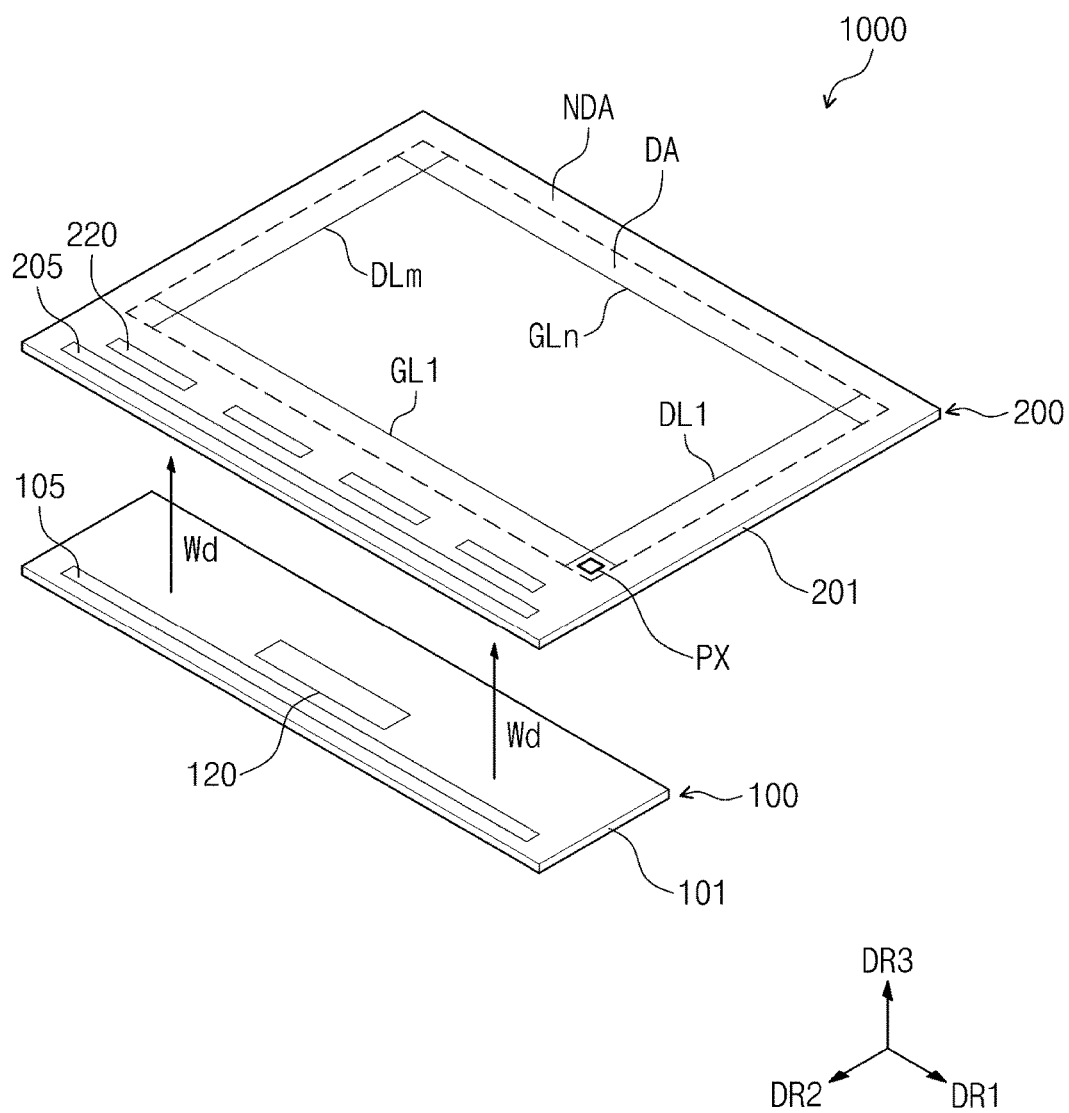
FIG. 1 is a perspective view illustrating a display apparatus according to an exemplary embodiment of the invention.

As the inventive concept can have various modifications made thereto and can be embodied in different forms, specific embodiments of the inventive concept are illustrated in the accompanying drawings and are hereinafter described in detail. However, it should be understood that this is not to limit the inventive concept to specific disclosures, but to include all modifications, equivalents, and substitutes within the spirit and scope of the inventive concept.

It will be further understood that the terms "comprise," "comprising," or "include," "including," used herein specify the presence of stated properties, numbers, steps, operations, elements, components or a combination thereof, but do not preclude the presence or addition of one or more other properties, numbers, steps, operations, elements, components or a combination thereof. In addition, when an element such as a layer, a film, a region, and a board is referred to as being "on" other element, it can be directly on the other element, or an intervening element may also be present. On the contrary, when an element such as a layer, a film, a region, and a board is referred to as being "below" other element, it can be directly below the other element, or an intervening element may also be present.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

The term "unit" in the specification may refer to a special purpose processor of which a structure is well know to one having ordinary skill in the art.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

When descriptions are given with reference to the drawings, like reference numbers refer to like elements throughout the entire specification. In the drawings, the dimensions of elements are exaggerated for clarity of illustration. It will be understood that although the terms of first and second are used herein to describe various elements and/or sections, these elements and/or sections should not be limited by these terms. These terms are only used to distinguish one element, component, or section from another element, component, or section. For example, a first element, a first component, or a first section that will be described below may be a second element, a second component, or a second section within the technical scope of the present disclosure. The terms of a singular form may include plural forms unless otherwise specified.

Hereinafter, exemplary embodiments of the invention will be described in more detail with reference to the accompanying drawings.

FIG. 1 is a perspective view illustrating a display apparatus according to an exemplary embodiment of the invention.

Referring to FIG. 1, a display apparatus 1000 may include a printed circuit board ("PCB") 100 and a display panel 200 overlapping the PCB 100 in a thickness direction (e.g., vertical direction in FIG. 1).

In an exemplary embodiment of the invention, the display panel 200 may include a display area DA and a non-display area NDA. The display area DA may display an image. The display area DA may include a plurality of pixels PX. In FIG. 1, a single pixel PX is illustrated by way of example, and illustration of remaining pixels PX is omitted for convenience.

The non-display area NDA may not display an image. In the non-display area NDA, wiring, a driving circuit, and a driving device for driving the pixel may be disposed. The non-display area NDA may, for example, enclose the display area DA. The non-display area NDA may define a bezel of the display apparatus 1000.

The display panel 200 includes gate lines GL1 to GLn, data lines DL1 to DLm, and pixels PX where n and m are natural numbers. The gate lines GL1 to GLn extend, for example, in a first direction DR1, and are arranged in a second direction DR2. The data lines DL1 to DLm insulatedly cross the gate lines GL1 to GLn. In an exemplary embodiment, the data lines DL1 to DLm may extend in the second direction DR2, and be arranged in the first direction DR1. The first and second directions DR1 and DR2 may be, for example, perpendicular to each other. A thickness direction may be parallel to a third direction DR3 perpendicular to the first and second directions DR1 and DR2.

The pixels PX are connected to corresponding gate lines of the gate lines GL1 to GLn and corresponding data lines of the data lines DL1 to DLm.

The pixels PX may be arranged in a matrix form in the first and second directions DR1 and DR2. In an exemplary embodiment, each of the pixels PX may include a plurality of sub-pixels (not illustrated) displaying any one of primary colors such as red, green, and blue, for example. Colors which the sub-pixels display may not be limited to red, green, and blue, and the sub-pixels may display various colors such as secondary primary colors like white, or yellow, cyan, and magenta, for example, in addition to red, green, and blue.

The pixel PX is an element for displaying a unit image, and the resolution of the display panel 200 may be determined according to the number of the pixels PX provided to the display panel 200.

The display panel 200 may include a panel substrate 201, a wireless receiver 205 disposed on the panel substrate 201, and a data driver 220 disposed on the panel substrate 201. The wireless receiver 205 and the data driver 220 may be disposed in the non-display area NDA.

The data driver 220 may be, for example, spaced apart from the display area DA in the second direction DR2. When viewed in a plane, the data driver 220 may be disposed between the wireless receiver 205 and the display area DA.

The wireless receiver 205 may be spaced apart from the display area DA in the second direction DR2, and be disposed along one end of the panel substrate 201.

The PCB 100 may include a base circuit board 101, a wireless transmitter 105 disposed on the base circuit board 101, and a circuit device 120 disposed on the base circuit board 101. In an exemplary embodiment, a circuit device may include active devices such as a memory including a chip, and a microprocessor in addition to passive elements such as a capacitor, an inductor, a resistor, and wiring.

The circuit device 120 may, for example, include a main processing unit of the display apparatus 1000. The main processing unit may control overall operations of the display panel 200. In an exemplary embodiment, the main processing unit receives input image signals (not illustrated) inputted from the outside of the display apparatus 1000, converts data formats of the input image signals in order to match an interface specification and a driving mode of the data driver 220, and then generates input image data, for example.

The wireless transmitter 105 may be, for example, spaced apart from the circuit device 120 in the second direction DR2, and be disposed along one end of the base circuit board 101. The wireless transmitter 105 may overlap the wireless receiver 205 in a thickness direction.

The wireless transmitter 105 may receive the input image data, and wirelessly transmit the input image data to the wireless receiver 205 as wireless data Wd.

The wireless receiver 205 may receive the wireless data Wd, convert the wireless data Wd to restored image data, and output the restored image data to the data driver 220. The data driver 220 may convert the restored image data received from the wireless receiver 205 to a data voltage to output to the pixel PX.

The wireless transmitter 105 may wirelessly transmit power to the wireless receiver 205.

In an exemplary embodiment of the invention, the wireless transmitter 105 and the wireless receiver 205 are not physically coupled to each other. In other words, a current path on which a current flows directly is not formed between the wireless transmitter 105 and the wireless receiver 205.

Since the wireless transmitter 105 of the PCB 100 may wirelessly transmit image data and power to the wireless receiver 205 of the display panel 200 as the wireless data Wd, an existing component (for example, a flexible PCB) for physically connecting the PCB 100 and the display panel 200 may be omitted.

Accordingly, when the display apparatus 1000 is manufactured, a process with reference to a coupling of the flexible PCB may be omitted, and a manufacturing process time may be effectively reduced.

Additionally, since the PCB 100 and the display panel 200 are not physically coupled, the PCB 100 may become easily uncoupled from the display panel 200 when the display apparatus 1000 is reworked for reusing some components of the display apparatus 1000. Accordingly, a time taken to rework may be decreased, and damage to the PCB 100 and the display panel 200 may be prevented.

Figure 2:
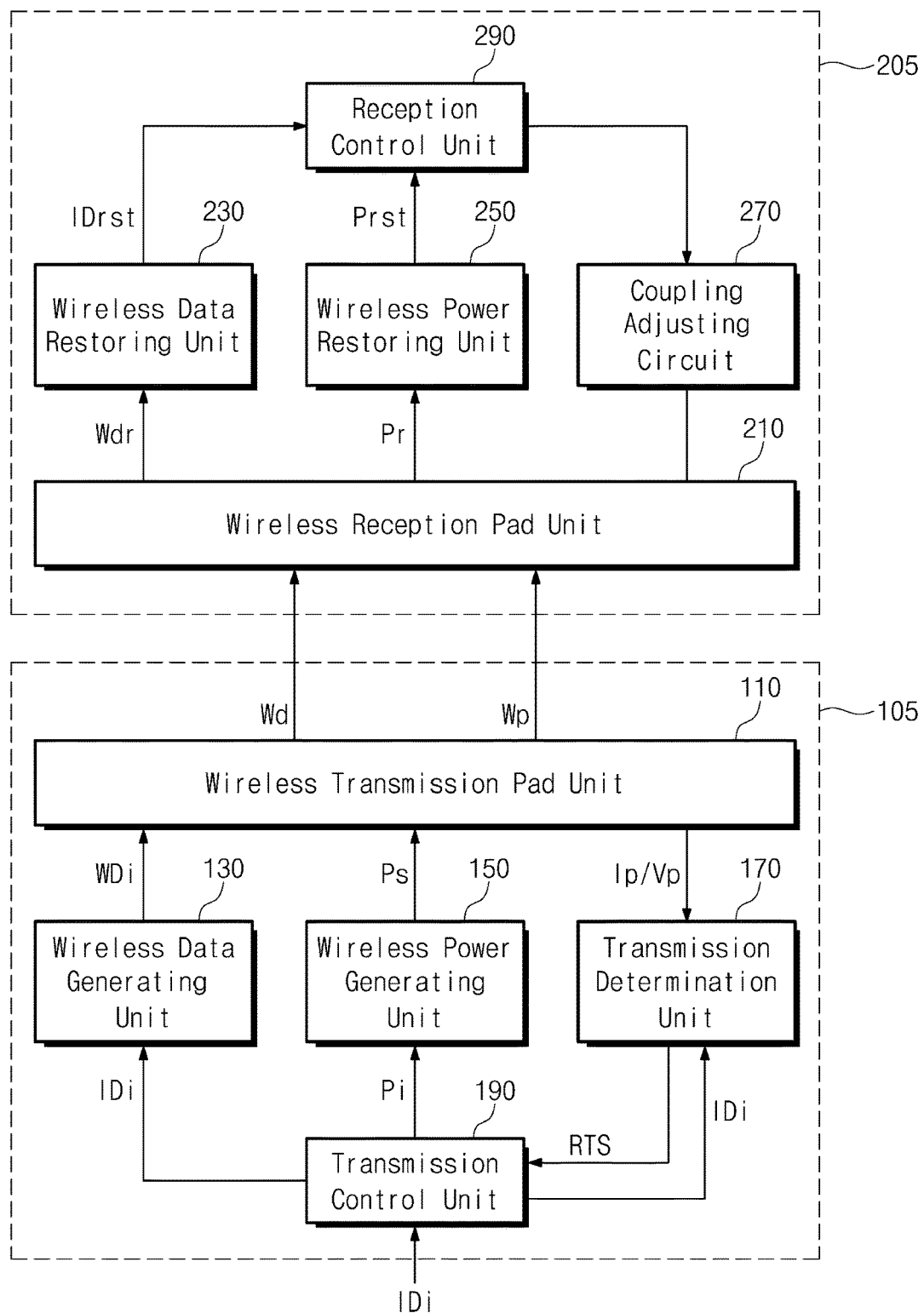
FIG. 2 is a block diagram illustrating a wireless receiver and a wireless transmitter illustrated in FIG. 1.

FIG. 2 is a block diagram illustrating the wireless receiver 205 and the wireless transmitter 105 illustrated in FIG. 1.

Referring to FIG. 2, the wireless transmitter 105 may include a wireless transmission pad unit 110, a wireless data generating unit 130, a wireless power generating unit 150, a transmission determination unit 170, and a transmission control unit 190.

The transmission control unit 190 may control overall operations of the wireless data generating unit 130, the wireless power generating unit 150, and the transmission determination unit 170. The transmission control unit 190 may receive input image data IDi, and transmit the same to the wireless data generating unit 130. The transmission control unit 190 may, for example, perform processing such as compensation, transformation, and correction for the input image data IDi when necessary, and output the processed input image data IDi to the wireless data generating unit 130.

In addition, the transmission control unit 190 may output an input power Pi. The transmission control unit 190 may directly generate the input power Pi or receive the input power Pi to transmit the same to the wireless power generating unit 150. In an exemplary embodiment, the transmission control unit 190 may, for example, perform processing such as step-up and step-down for the input power Pi when necessary, and output the processed input power Pi to the wireless power generating unit 150.

The wireless data generating unit 130 receives the input image data IDi, and converts the input image data IDi to a data transmission signal WDi such that the input image data IDi may be wirelessly transmitted through the wireless transmission pad unit 110. In an exemplary embodiment, the data transmission signal WDi may be an alternating current or voltage corresponding to the input image data IDi, for example. In an exemplary embodiment of the invention, the data transmission signal WDi may have an alternating current or voltage value corresponding to a high logic level (for example, "1") or a low logic level (for example, "0").

The wireless power generating unit 150 receives the input power Pi, and converts the input power Pi to a transmitted power Ps such that the input power Pi may be wirelessly transmitted through the wireless transmission pad unit 110. In an exemplary embodiment, the transmitted power Ps may be an alternating current or voltage corresponding to the input power Pi, for example.

The wireless transmission pad unit 110 may perform a function as an antenna for transmitting data or power. The wireless transmission pad unit 110 may receive the data transmission signal WDi from the wireless data generating unit 130, and wirelessly transmit the data transmission signal WDi as the wireless data Wd. Additionally, the wireless transmission pad unit 110 may receive the transmitted power Ps from the wireless power generating unit 150, and wirelessly transmit the transmitted power Ps as a wireless power Wp.

In an exemplary embodiment, the wireless transmission pad unit 110 may include, for example, a coil for forming a pad current Ip, or an electrode for forming a pad voltage Vp so as to wirelessly transmit data or power in a short distance.

The transmission determination unit 170 may determine that the wireless data Wd and/or the wireless power Wp have been successfully transmitted, and transmit a determination result to the transmission control unit 190. The transmission determination unit 170 may detect the pad current Ip flowing and the pad voltage Vp applied at the wireless transmission pad unit 110 when the data transmission signal WDi and/or the transmitted power Ps are supplied to the wireless transmission pad unit 110, and may determine whether the wireless data Wd and/or the wireless power Wp have been successfully transmitted wirelessly, based on the pad current Ip or the pad voltage Vp.

In an exemplary embodiment, the transmission determination unit 170 may determine whether the wireless data Wd is transmitted wirelessly by receiving the input image data IDi from the transmission control unit 190, predicting the pad current Ip or the pad voltage Vp corresponding to the input image data IDi based on the input image data IDi, and comparing the predicted pad current or pad voltage with the pad current Ip or the pad voltage Vp detected at the wireless transmission pad unit 110, for example.

Since the pad current Ip and the pad voltage Vp are determined by a mutual impedance formed by a coupling between the wireless transmission pad unit 110 and the wireless reception pad unit 210 as well as a self-impedance of the wireless transmission pad unit 110, the transmission determination unit 170 may determine characteristics of the coupling between the wireless transmission pad unit 110 and the wireless reception pad unit 210, and determine whether the wireless data Wd is transmitted wirelessly, by comparing the predicted pad current or pad voltage with the detected pad current Ip or pad voltage Vp.

When the transmission determination unit 170 does not determine that the wireless data Wd is transmitted, the transmission determination unit 170 outputs a retransmission signal RTS to the transmission control unit 190 such that the wireless transmission pad unit 110 may retransmit the wireless data Wd.

More specifically, the transmission determination unit 170 outputs a retransmission signal RTS to the transmission control unit 190, and the transmission control unit 190, based on the retransmission signal RTS, retransmits the input image data IDi to the wireless data generating unit 130. The wireless data generating unit 130 re-converts the retransmitted input image data IDi to the data transmission signal WDi, and outputs the same to the wireless transmission pad unit 110. The wireless transmission pad unit 110 may retransmit a valid wireless data Wd to the wireless reception pad unit 210 in response to the re-converted data transmission signal WDi.

The wireless receiver 205 may include the wireless reception pad unit 210, a wireless data restoring unit 230, a wireless power restoring unit 250, and a coupling adjusting circuit 270.

The wireless reception pad unit 210 may perform a function as an antenna for receiving data or power. Wireless transmission and reception may be enabled between the wireless reception pad unit 210 and the wireless transmission pad unit 110 by the wireless reception pad unit 210 becoming coupled to the wireless transmission pad unit 110 through a magnetic field, an electric field, and/or an electromagnetic field.

In this specification, wireless reception and wireless transmission may mean that an electrical signal, data or power is wirelessly received and transmitted by coupling through a magnetic field, an electric field, and/or an electromagnetic field.

The wireless reception pad unit 210 may wirelessly receive the wireless data Wd and the wireless power Wp, output a data reception signal Wdr in response to the wireless data Wd, and output a received power Pr in response to the wireless power Wp. In an exemplary embodiment, the data reception signal Wdr may be an alternating current or voltage corresponding to the wireless data Wd, and the received power Pr may be an alternating current or voltage corresponding to the wireless power Wp, for example.

In an exemplary embodiment, the wireless reception pad unit 210 may include, for example, a coil or an electrode corresponding to the wireless transmission pad unit 110 so as to wirelessly receive data or power in a short distance.

The wireless data restoring unit 230 receives the data reception signal Wdr, and generates restored image data IDrst from the data reception signal Wdr so as to restore the input image data IDi. The restored image data IDrst may have a format which may be processed in a reception control unit 290 or the data driver 220 illustrated in FIG. 1, and may have a high logic level or a low logic level corresponding to the data reception signal Wdr. The wireless data restoring unit 230 may output the restored image data IDrst to the reception control unit 290.

The wireless power restoring unit 250 receives the received power Pr, and generates a restored power Prst from the received power Pr. The restored power Prst may have a format which may be used in the reception control unit 290 or the data driver 220 illustrated in FIG. 1, and may be a direct current power. The wireless power restoring unit 250 may include an alternating current to direct current ("AC-DC") converter (not illustrated) for converting alternating current to direct current, or a DC-DC converter (not illustrated) for converting direct current voltage from one voltage level to another voltage level.

The coupling adjusting circuit 270 may control a resonant frequency of the wireless reception pad unit 210.

An efficiency of wireless transmission and wireless reception between the wireless transmission pad unit 110 and the wireless reception pad unit 210 may increase as a coupling between the wireless transmission pad unit 110 and the wireless reception pad unit 210 becomes stronger, and the coupling therebetween may increase as a resonant frequency of the wireless transmission pad unit 110 and the resonant frequency of the wireless reception pad unit 210 become closer together. The resonant frequency of the wireless reception pad unit 210 may be determined by a self-impedance of the wireless reception pad unit 210.

In an exemplary embodiment, the circuit device 120 (refer to FIG. 1) may control the resonant frequency of the wireless reception pad unit 210 by, for example, adjusting the self-impedance of the wireless reception pad unit 210. As a result, the circuit device 120 may control the wireless transmission and the wireless reception between the wireless transmission pad unit 110 and the wireless reception pad unit 210 by controlling the self-impedance and the resonant frequency of the wireless reception pad unit 210.

The reception control unit 290 may control overall operations of the wireless data restoring unit 230, the wireless power restoring unit 250, and the coupling adjusting circuit 270. The reception control unit 290 may receive the restored image data IDrst from the wireless data restoring unit 230 and the restored power Prst from the wireless power restoring unit 250, and transmit the same to the data driver 220 illustrated in FIG. 1.

Figure 3A:
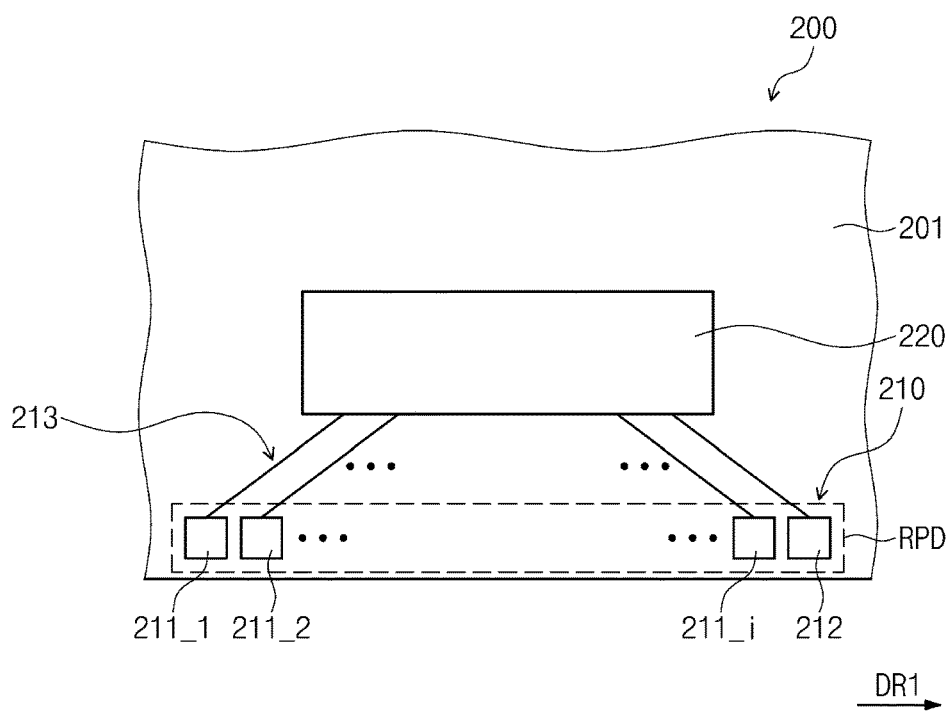
FIG. 3A is an enlarged plan view illustrating a portion of a display panel according to an exemplary embodiment of the invention.
Figure 3B:
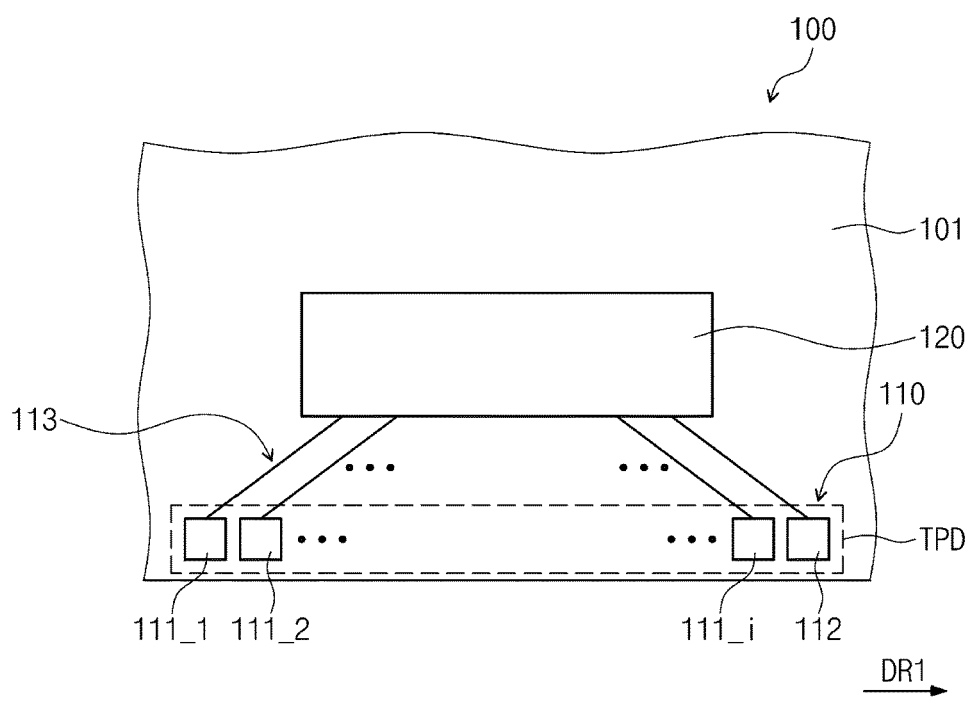
FIG. 3B is an enlarged plan view illustrating a portion of a printed circuit board ("PCB") according to an exemplary embodiment of the invention.

FIG. 3A is an enlarged plan view illustrating a portion of a display panel 200 according to an exemplary embodiment of the invention, and FIG. 3B is an enlarged plan view illustrating a portion of a PCB 100 according to an exemplary embodiment of the invention.

Referring to FIGS. 2 and 3A, the wireless reception pad unit 210 may include a plurality of reception pads RPD. The plurality of reception pads RPD may include a plurality of data reception pads 211_1 to 211_$i$ and a power reception pad 212. The plurality of data reception pads 211_1 to 211_$i$ may respectively include i data reception pads. The plurality of data reception pads 211_1 to 211_$i$ and the power reception pad 212 may be arranged along one end of the panel substrate 201 and in the first direction DR1.

The display panel 200 may further include panel wiring 213. The panel wiring 213 may electrically connect the plurality of reception pads RPD and the data driver 220.

In an exemplary embodiment of the invention, other components (the wireless data restoring unit 230, the wireless power restoring unit 250, or the like) in the wireless receiver 205 except for the wireless reception pad unit 210 may be realized, for example, as software or hardware in the data driver 220. However, this is not limited thereto, and other components in the wireless receiver 205 except for the wireless reception pad unit 210 may be realized as a separate block or chip and disposed in the display panel 200.

Referring to FIGS. 2 and 3B, the wireless transmission pad unit 110 may include a plurality of transmission pads TPD.

The plurality of transmission pads TPD may include a plurality of data transmission pads 111_1 to 111_$i$ and a power transmission pad 112. The plurality of data transmission pads 111_1 to 111_$i$ may respectively composed of i data transmission pads. The plurality of data transmission pads 111_1 to 111_$i$ and the power transmission pad 112 may be arranged along one end of the base circuit board 101 and in the first direction DR1.

The data transmission pads 111_1 to 111_$i$ may respectively overlap the data reception pads 211_1 to 211_$i$ illustrated in FIG. 3A in a thickness direction, and be respectively coupled to the data reception pads 211_1 to 211_$i$ illustrated in FIG. 3A.

The power transmission pad 112 may overlap the power reception pad 212 illustrated in FIG. 3A in the thickness direction, and be coupled to the power reception pad 212 illustrated in FIG. 3A.

The PCB 100 may further include circuit board wiring 113. The circuit board wiring 113 may electrically connect the plurality of transmission pads TPD and the circuit device 120.

In an exemplary embodiment of the invention, other components (the wireless data generating unit 130, the wireless power generating unit 150, or the like) in the wireless transmitter 105 except for the wireless transmission pad unit 110 may be realized, for example, as software or hardware in the circuit device 120. However, this is not limited thereto, and other components in the wireless transmitter 105 except for the wireless transmission pad unit 110 may be realized as a separate block or chip and disposed in the PCB 100.

Figure 4:
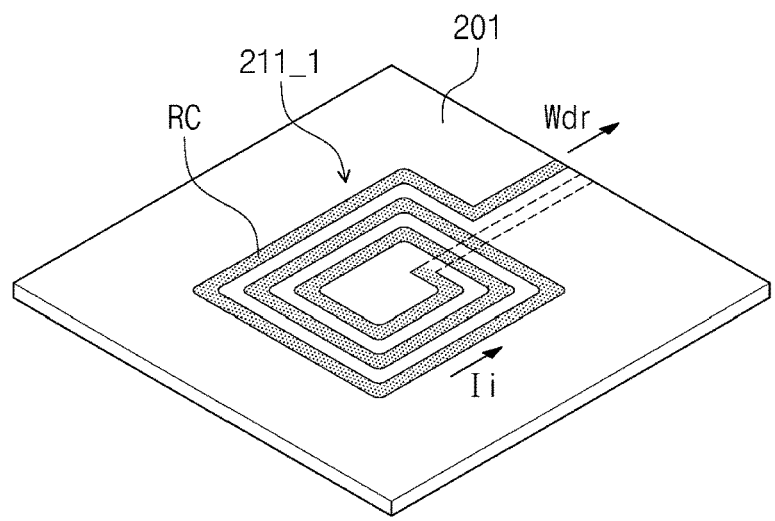
FIG. 4 is a perspective view illustrating a data reception pad and a data transmission pad according to an exemplary embodiment of the invention.
Figure 4:
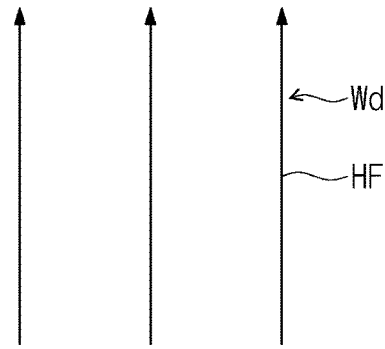
Figure 4:
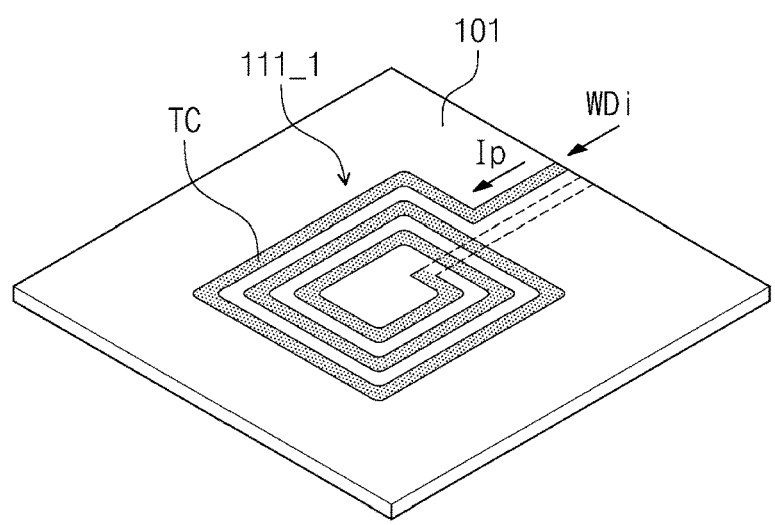

FIG. 4 is a perspective view illustrating a data reception pad and a data transmission pad according to an exemplary embodiment of the invention.

FIG. 4 illustrates a first data transmission pad 111_1 of the plurality of data transmission pads 111_1 to 111_$i$ illustrated in FIG. 3B, and a first data reception pad 211_1 of the plurality of data reception pads 211_1 to 211_$i$ illustrated in FIG. 3A.

The plurality of data transmission pads 111_1 to 111_$i$ has the substantially same structure, and thus only the data transmission pad 111_1 is described representatively. Additionally, the plurality of data reception pads 211_1 to 211_$i$ has the substantially same structure, and thus only the data reception pad 211_1 is described representatively.

Referring to FIG. 4, the data transmission pad 111_1 may include a transmission coil TC, and the data reception pad 211_1 may include a reception coil RC. The transmission coil TC may overlap the reception coil RC in the thickness direction. The transmission coil TC may be disposed on a top surface of the base circuit board 101, and the reception coil RC may be disposed on a top surface of the panel substrate 201.

As the data transmission signal WDi is supplied to the transmission coil TC, the pad current Ip of alternating current form may flow in the transmission coil TC, and a magnetic field HF parallel to the thickness direction may be formed in the transmission coil TC. The magnetic field HF passes through the reception coil RC.

The magnetic field HF may change according to the pad current Ip. The changing magnetic field HF may form the wireless data Wd. By the changing magnetic field HF, an induced current Ii of alternating current form may be formed or induced in the reception coil RC. The induced current Ii may form the data reception signal Wdr.

Figure 5:
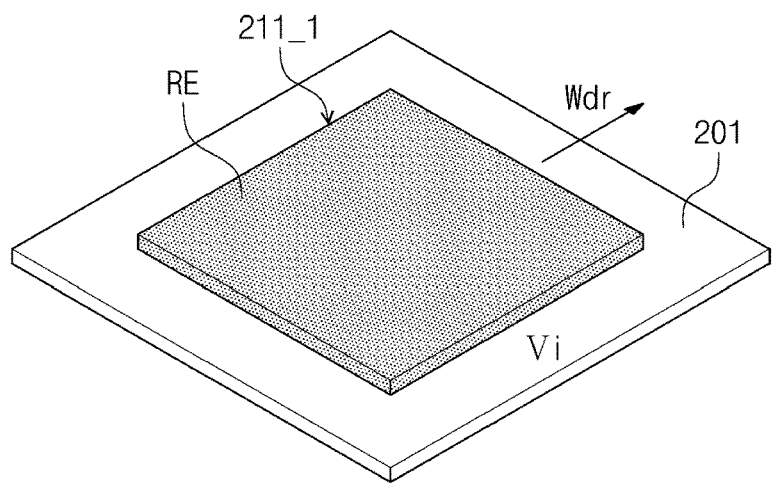
FIG. 5 is a perspective view illustrating a data reception pad and a data transmission pad according to an exemplary embodiment of the invention.
Figure 5:
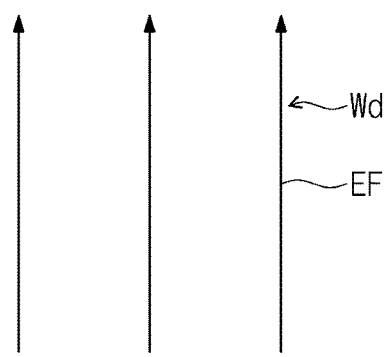
Figure 5:
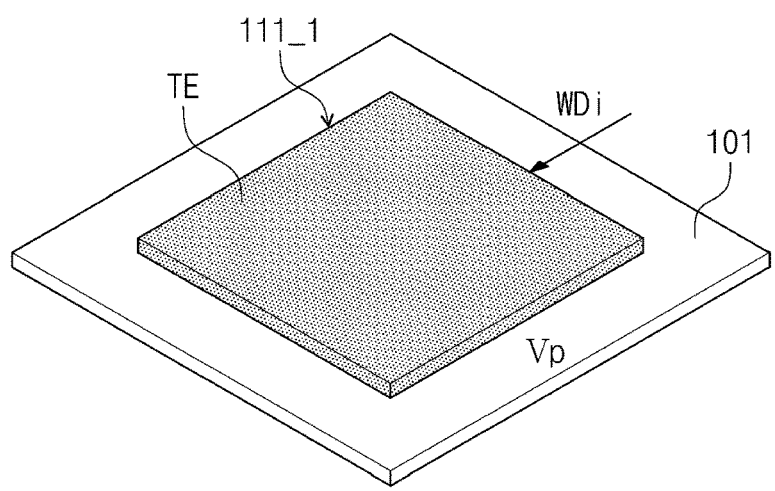

FIG. 5 is a perspective view illustrating a data reception pad and a data transmission pad according to an exemplary embodiment of the invention.

FIG. 5 illustrates a first data transmission pad 111_1 of the plurality of data transmission pads 111_1 to 111_$i$ illustrated in FIG. 3B, and a first data reception pad 211_1 of the plurality of data reception pads 211_1 to 211_$i$ illustrated in FIG. 3A. The plurality of data transmission pads 111_1 to 111_$i$ has the substantially same structure, and thus only the data transmission pad 111_1 is described representatively. Additionally, the plurality of data reception pads 211_1 to 211_$i$ has the substantially same structure, and thus only the data reception pad 211_1 is described representatively.

Referring to FIG. 5, the data transmission pad 111_1 may include a transmission electrode TE, and the data reception pad 211_1 may include a reception electrode RE. The transmission electrode TE may overlap the reception electrode RE in the thickness direction. The transmission electrode TE may be disposed on the top surface of the base circuit board 101, and the reception electrode RE may be disposed on the top surface of the panel substrate 201.

As the data transmission signal WDi is supplied to the transmission electrode TE, the pad voltage Vp of alternating voltage form may be applied at the transmission electrode TE, and an electric field EF parallel to the thickness direction may be formed between the transmission electrode TE and the reception electrode RE.

The electric field EF may change according to the pad voltage Vp. The changing electric field EF may form the wireless data Wd. By the changing electric field EF, an induced voltage Vi may be formed or induced in the reception electrode RE. The induced voltage Vi may form the data reception signal Wdr.

Figure 6:
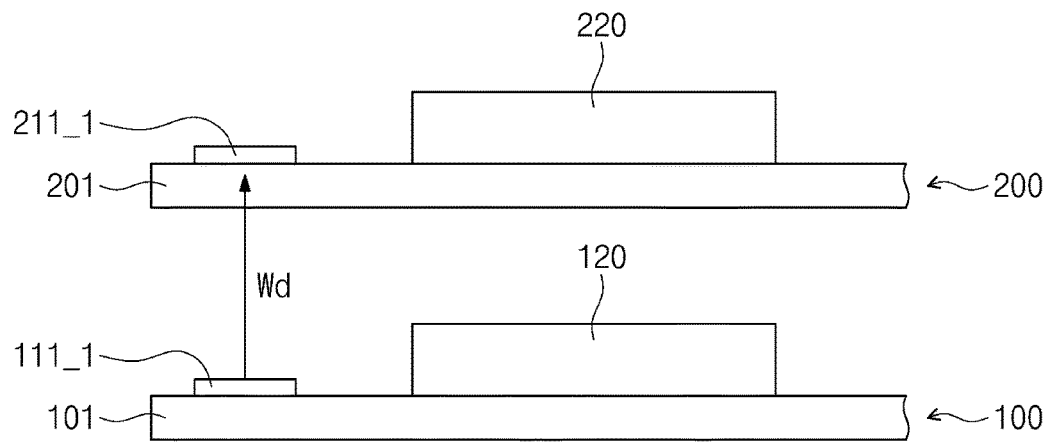
FIG. 6 is a cross-sectional view illustrating a display apparatus according to an exemplary embodiment of the invention.

FIG. 6 is a cross-sectional view illustrating a display apparatus according to an exemplary embodiment of the invention.

Referring to FIG. 6, the PCB 100 may be disposed below the display panel 200. The data transmission pad 111_1 and the circuit device 120 may be disposed on the top surface of the base circuit board 101, and the data reception pad 211_1 and the data driver 220 may be disposed on the top surface of the panel substrate 201.

The data transmission pad 111_1 may generate the wireless data Wd, and the wireless data Wd may reach the data reception pad 211_1 through the panel substrate 201. The data reception pad 211_1 may receive the wireless data Wd which passes through the panel substrate 201.

In an exemplary embodiment of the invention, the data reception pad 211_1 may be realized by various metal layers of the display panel 200. More specifically, the data reception pad 211_1 may be disposed in the same layer, for example, as an anode or a cathode of the pixel PX illustrated in FIG. 1, or as a gate electrode, a source electrode, a drain electrode, or the like of a transistor of the pixel PX, and may be formed together when the aforementioned electrodes of the transistor are formed.

Figure 7:
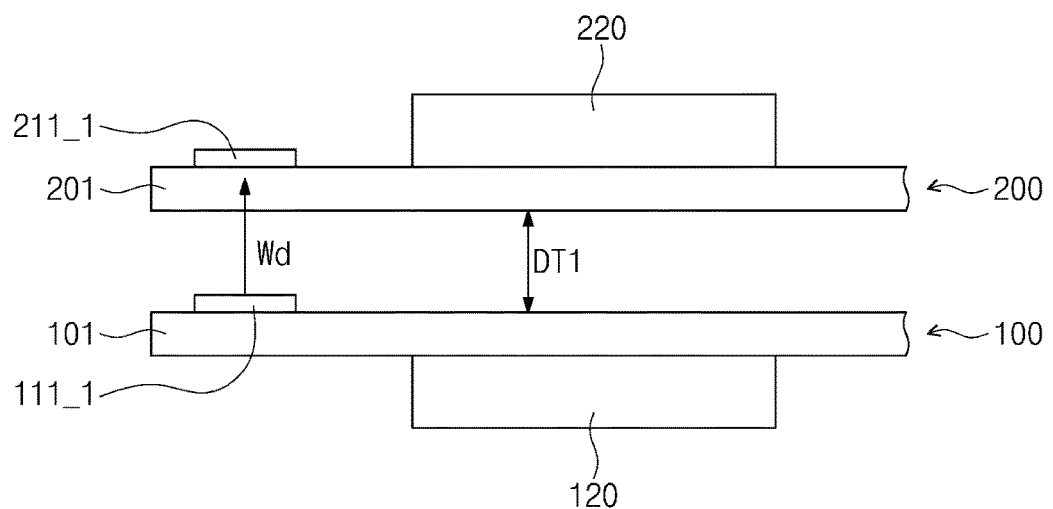
FIG. 7 is a cross-sectional view illustrating a display apparatus according to an exemplary embodiment of the invention.

FIG. 7 is a cross-sectional view illustrating a display apparatus according to an exemplary embodiment of the invention.

Referring to FIG. 7, the PCB 100 may be disposed below the display panel 200. The data transmission pad 111_1 may be disposed on the top surface of the base circuit board 101, and the circuit device 120 may be disposed on a bottom surface of the base circuit board 101. The data reception pad 211_1 and the data driver 220 may be disposed on the top surface of the panel substrate 201.

The data transmission pad 111_1 may generate the wireless data Wd, and the wireless data Wd may reach the data reception pad 211_1 through the panel substrate 201. The data reception pad 211_1 may receive the wireless data Wd which passes through the panel substrate 201.

Since the circuit device 120 is disposed on the bottom surface of the base circuit board 101, the distance between the data transmission pad 111_1 and the data reception pad 211_1 may be designed to be small. In an exemplary embodiment, a first distance DT1 between the data transmission pad 111_1 and the panel substrate 201 in the thickness direction may be smaller than the thickness of the circuit device 120, for example. As a result, an efficiency of transmission and reception of the wireless data Wd may be improved, and the wireless data Wd may be stably transmitted and received.

Figure 8:
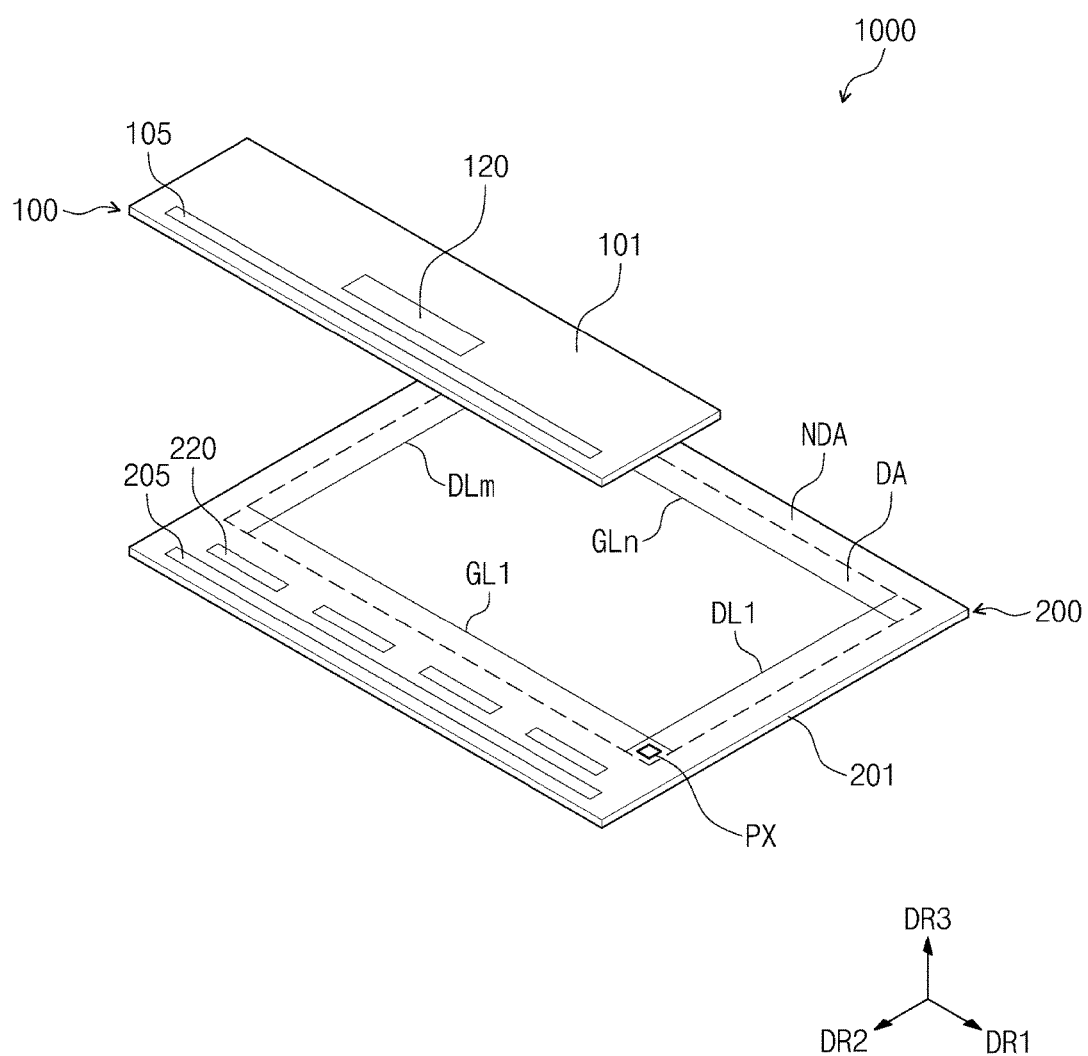
FIG. 8 is a perspective view illustrating a display apparatus according to an exemplary embodiment of the invention.
Figure 9:
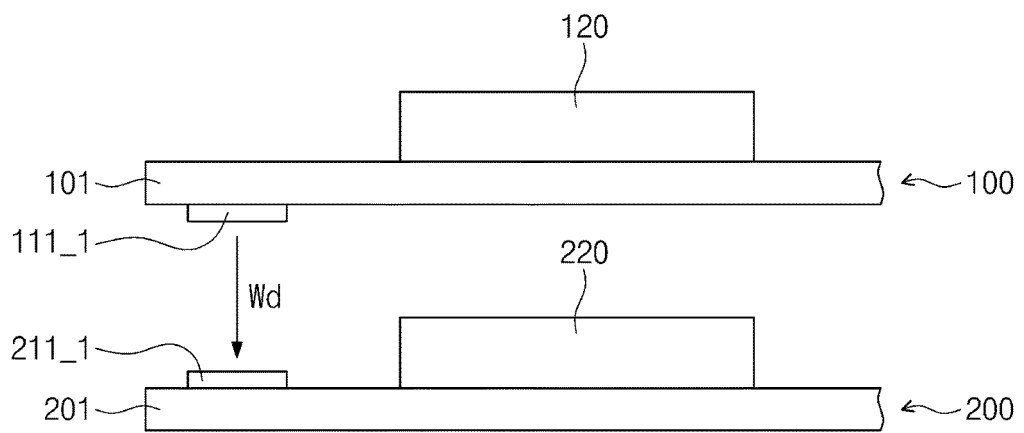
FIG. 9 is a side view illustrating the display apparatus illustrated in FIG. 8.

FIG. 8 is a perspective view illustrating a display apparatus according to an exemplary embodiment of the invention, and FIG. 9 is a side view illustrating the display apparatus illustrated in FIG. 8.

Referring to FIGS. 8 and 9, in an exemplary embodiment of the invention, the PCB 100 may be disposed on the display panel 200.

The data transmission pad 111_1 may be disposed on the bottom surface of the base circuit board 101, and the circuit device 120 may be disposed on the top surface of the base circuit board 101. The data reception pad 211_1 and the data driver 220 may be disposed on the top surface of the panel substrate 201.

The data transmission pad 111_1 may generate the wireless data Wd, and the wireless data Wd may reach the data reception pad 211_1. The data reception pad 211_1 may receive the wireless data Wd directly.

Since the data transmission pad 111_1 is disposed on the bottom surface of the base circuit board 101, and thus the wireless data Wd may reach the data reception pad 211_1 directly without passing through other components or matter, the wireless data Wd may not be distorted. As a result, an efficiency of transmission and reception of the wireless data Wd may be improved, and the wireless data Wd may be stably transmitted and received.

Figure 10A:
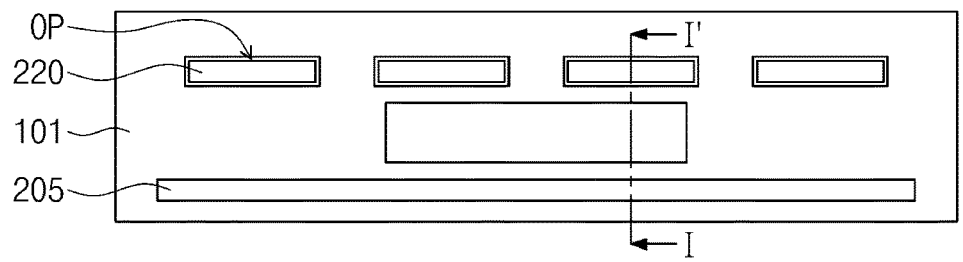
FIG. 10A is a plan view illustrating a PCB according to an exemplary embodiment of the invention.
Figure 10B:
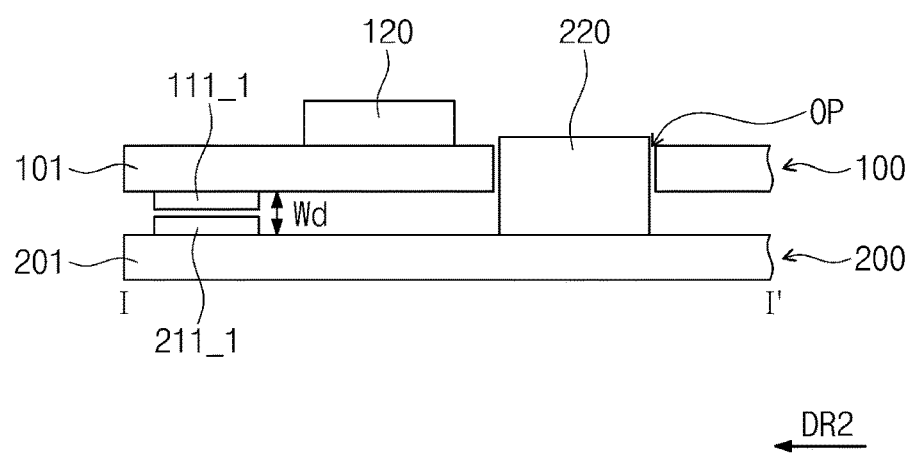
FIG. 10B is a side view illustrating a display apparatus according to an exemplary embodiment of the invention.

FIG. 10A is a plan view illustrating a PCB according to an exemplary embodiment of the invention, and FIG. 10B is a side view illustrating a display apparatus according to an exemplary embodiment of the invention.

Referring to FIGS. 10A and 10B, the PCB 100 may be disposed on the display panel 200.

The data transmission pad 111_1 may be disposed on the bottom surface of the base circuit board 101, and the circuit device 120 may be disposed on the top surface of the base circuit board 101. The data reception pad 211_1 and the data driver 220 may be disposed on the top surface of the panel substrate 201.

An opening OP may be defined in the PCB 100. The opening OP may overlap the data driver 220 in the thickness direction. The data driver 220 may be inserted into the opening OP. An upper part of the data driver 220 may overlap the PCB 100 and/or the circuit device 120 in the second direction DR2.

The data transmission pad 111_1 may generate the wireless data Wd, and the wireless data Wd may reach the data reception pad 211_1. The data reception pad 211_1 may receive the wireless data Wd directly.

Since the data transmission pad 111_1 is disposed on the bottom surface of the base circuit board 101, and thus the wireless data Wd may reach the data reception pad 211_1 directly without passing through other components or matter, the wireless data Wd may not be distorted. As a result, an efficiency of transmission and reception of the wireless data Wd may be improved, and the wireless data Wd may be stably transmitted and received.

Further, since the data driver 220 is inserted into the opening OP, the distance between the data transmission pad 111_1 and the data reception pad 211_1 may be designed to be substantially small. In an exemplary embodiment, the distance between the base circuit board 101 and the panel substrate 201 in the thickness direction may be smaller than the thickness of the data driver 220, for example. As a result, an efficiency of transmission and reception of the wireless data Wd may be improved, and the wireless data Wd may be stably transmitted and received.

Figure 11:
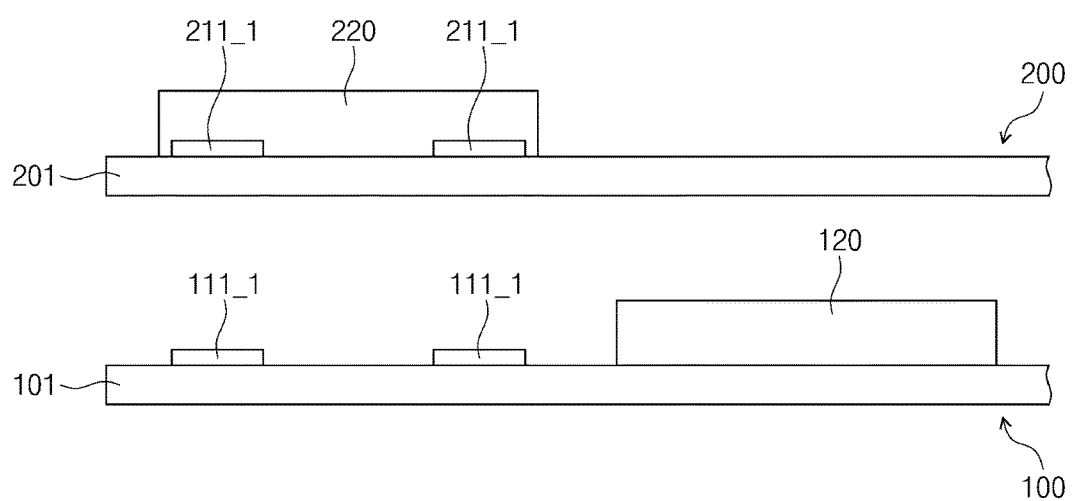
FIG. 11 is a cross-sectional view illustrating a display apparatus according to an exemplary embodiment of the invention.

FIG. 11 is a cross-sectional view illustrating a display apparatus according to an exemplary embodiment of the invention.

Referring to FIG. 11, in an exemplary embodiment of the invention, the data reception pad 211_1 may be disposed (e.g., embedded) inside the data driver 220. The data reception pad 211_1 may be formed, for example, when the data driver 220 is manufactured.

Accordingly, compared to the display panel 200 illustrated in FIG. 6, a separate region for the data reception pad 211_1 may not be desired in the panel substrate 201, and a separate wiring (for example, the panel wiring 213 illustrated in FIG. 3) to connect the data reception pad 211_1 and the data driver 220 may not be desired. As a result, the degree of integration of the display panel 200 may increase, and a bezel of the display panel 200 may be narrowly defined.

Figure 12:
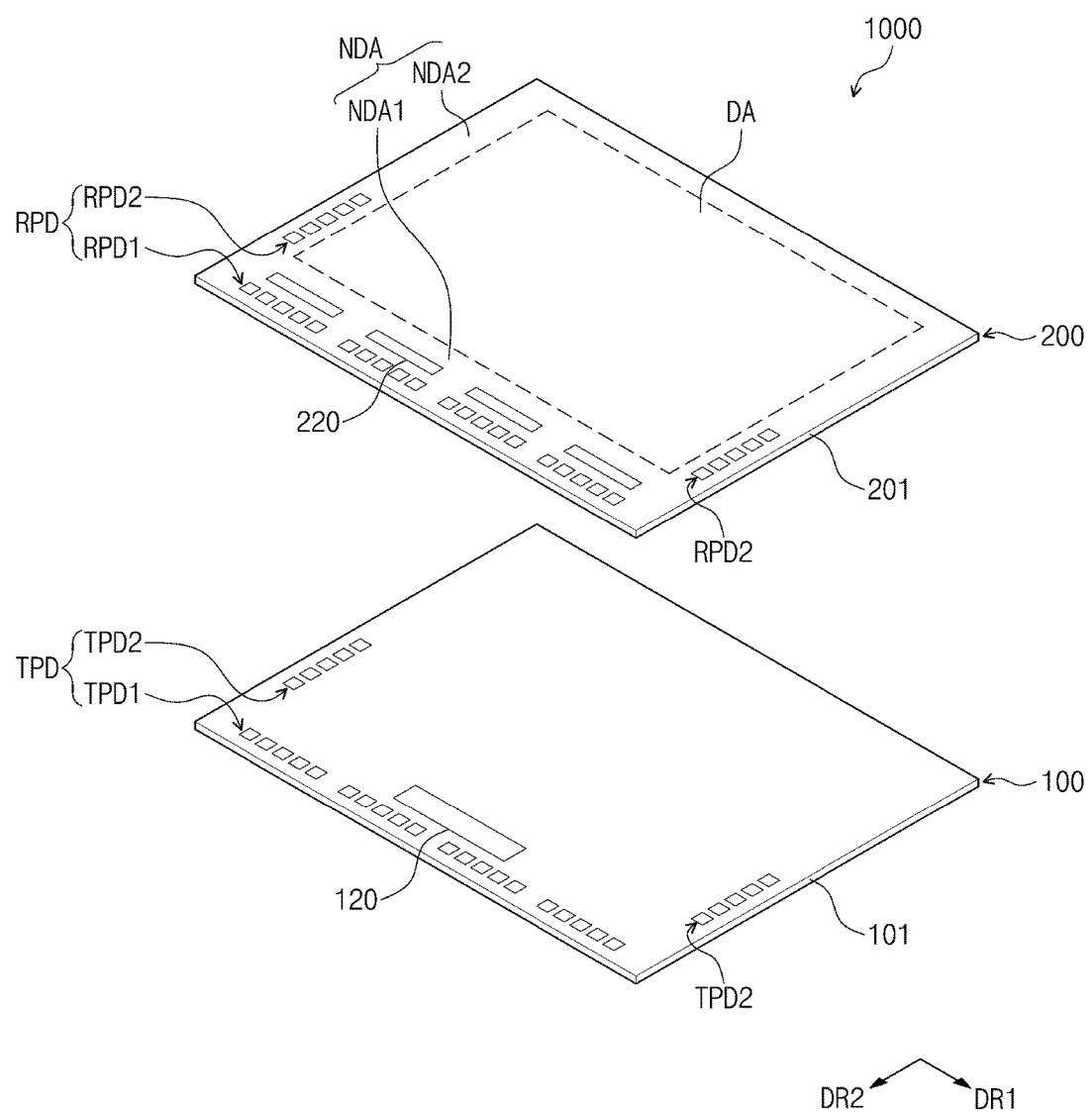
FIG. 12 is a perspective view illustrating a display apparatus according to an exemplary embodiment of the invention.

FIG. 12 is a perspective view illustrating a display apparatus according to an exemplary embodiment of the invention.

The non-display area NDA illustrated in FIG. 12 may be divided, for example, into first and second non-display areas NDA1 and NDA2.

The first non-display area NDA1 may be spaced apart from the display area DA in the second direction DR2, and extend in the first direction DR1. The data driver 220 may be disposed in the first non-display area NDA1.

The second non-display area NDA2 may be spaced apart from the display area DA in the first direction DR1, and extend in the second direction DR2. The second non-display area NDA2 may be defined on both sides of the display area DA. In the second non-display area NDA2, a gate driver (not illustrated), for example, may be disposed.

In an exemplary embodiment of the invention, the plurality of reception pads RPD may include first reception pads RPD1 and second reception pads RPD2. The first reception pads RPD1 may include, for example, the data reception pads 211_1 to 211_i and the power reception pad 212 illustrated in FIG. 3A.

The first reception pads RPD1 may be disposed in the first non-display area NDA1, and be arranged in the first direction DR1. The second reception pads RPD2 may be disposed in the second non-display area NDA2, and be arranged in the second direction DR2.

In an exemplary embodiment of the invention, the plurality of transmission pads TPD may include first transmission pads TPD1 and second transmission pads TPD2. The first transmission pads TPD1 may include, for example, the data transmission pads 111_1 to 111_i and the power transmission pad 112 illustrated in FIG. 3B.

The first transmission pads TPD1 may be disposed below the first non-display area NDA1, and be arranged in the first direction DR1. The first transmission pads TPD1 may respectively overlap the first reception pads RPD1 in the thickness direction. The first transmission pads TPD1 may include, for example, the data transmission pads 111_1 to 111_i and the power transmission pad 112 illustrated in FIG. 3B.

The second transmission pads TPD2 may be disposed below the second non-display area NDA2, and be arranged in the second direction DR2. The second transmission pads TPD2 may respectively overlap the second reception pads RPD2 in the thickness direction.

As a result, since the plurality of transmission pads TPD and the plurality of reception pads RPD may be disposed in the second non-display area NDA2 as well as the first non-display area NDA1, the wireless data Wd may be transmitted and received through a larger number of pads TPD and RPD. As the number of the pads TPD and RPD increases, speeds of transmission and reception of each of the pads TPD and RPD may be decreased. As the speeds of transmission and reception of each of the pads TPD and RPD are decreased, an efficiency and reliability of wireless transmission and wireless reception may be improved.

Although the exemplary embodiments of the invention have been described herein, it is understood that various changes and modifications can be made by those skilled in the art within the spirit and scope of the invention defined by the following claims or the equivalents.

Therefore, the scope of the invention is defined by the following claims or the equivalents rather than the foregoing detailed description.

What is claimed is:

1. A display apparatus comprising:
    a printed circuit board including:
        a base circuit board;
        a transmission control unit which outputs input image data,
        a wireless data generating unit which converts the input image data to a data transmission signal,
        a wireless transmission pad unit which wirelessly transmits the data transmission signal as wireless data and is disposed on a bottom surface of the base circuit board; and
        a circuit device disposed on a top surface of the based circuit board;
    and
    a display panel including:
        a panel substrate;
        a wireless reception pad unit which is coupled to the wireless transmission pad unit, and wirelessly receives the wireless data to output a data reception signal,
        a wireless data restoring unit which converts the data reception signal to restored image data; and,
        a data driver disposed on a top surface of the panel substrate and converts the restored image data to a data voltage,
    wherein the data driver is inserted into an opening defined at the printed circuit board.

2. The display apparatus of claim 1, wherein the wireless reception pad unit overlaps the wireless transmission pad unit in a thickness direction.

3. The display apparatus of claim 1, wherein
    a pixel which receives the data voltage.

4. The display apparatus of claim 1, further comprising a transmission determination unit which detects, as the data transmission signal is provided, a pad current which flows at the wireless transmission pad unit or a pad voltage applied at the wireless transmission pad unit, and determines whether the wireless data is wirelessly transmitted based on the pad current or the pad voltage.

5. The display apparatus of claim 4, wherein, when the wireless data is not transmitted wirelessly, the transmission determination unit outputs a retransmission signal to the transmission control unit and the wireless transmission pad unit retransmits the wireless data to the wireless reception pad unit.

6. The display apparatus of claim 5, wherein the transmission control unit retransmits the input image data based on the retransmission signal, and the wireless data generating unit converts the retransmitted input image data to the data transmission signal.

7. The display apparatus of claim 1, wherein the display panel further includes a coupling adjusting circuit which controls a resonant frequency of the wireless reception pad unit and adjusts a coupling between the wireless reception pad unit and the wireless transmission pad unit.

8. The display apparatus of claim 1, wherein
    the printed circuit board further includes a wireless power generating unit which converts an input power to a transmitted power, wherein the wireless transmission pad unit wirelessly transmits the transmitted power as a wireless power, and the wireless reception pad unit wirelessly receives the wireless power to output a received power, and
    the display panel further includes a wireless power restoring unit which converts the received power to a restored power.

9. The display apparatus of claim 8, wherein
    the wireless transmission pad unit comprises a data transmission pad which wirelessly transmits the wireless data and a power transmission pad which wirelessly transmits the wireless power, and
    the wireless reception pad unit comprises a data reception pad which is coupled to the data transmission pad and wirelessly receives the wireless data, and a power reception pad which is coupled to the power transmission pad and wirelessly receives the wireless power.

10. The display apparatus of claim 1, wherein
    the wireless transmission pad unit comprises a plurality of transmission pads arranged in one direction, and
    the wireless reception pad unit comprises a plurality of reception pads arranged in the one direction,
    wherein the plurality of transmission pads respectively overlap the plurality of reception pads in a thickness direction, and are respectively coupled to the plurality of reception pads.

11. The display apparatus of claim 10, wherein each of the plurality of transmission pads comprises a transmission coil, and each of the plurality of reception pads comprises a reception coil, wherein the transmission coil induces an induced current in the reception coil.

12. The display apparatus of claim 10, wherein each of the plurality of transmission pads comprises a transmission electrode, and each of the plurality of reception pads comprises a reception electrode, wherein the transmission electrode induces an induced voltage in the reception electrode.

13. The display apparatus of claim 1, wherein a distance between the base circuit board and the panel substrate in a thickness direction is less than a thickness of the data driver.

14. The display apparatus of claim 1, wherein the wireless reception pad unit is embedded in the data driver.

15. The display apparatus of claim 1, wherein
    the display panel further includes a display area which displays an image and a first non-display area spaced apart from the display area in a first direction,
    the wireless reception pad unit comprises a plurality of first reception pads disposed in the first non-display area and arranged in a second direction different from the first direction, and
    the wireless transmission pad unit comprises a plurality of first transmission pads respectively overlapping the plurality of first reception pads in a thickness direction.

16. The display apparatus of claim 15, wherein
    the display panel further includes a second non-display area spaced apart from the display area in the second direction, the wireless reception pad unit further comprises a plurality of second reception pads disposed in the second non-display area and arranged in the first direction, and the wireless transmission pad unit further comprises a plurality of second transmission pads respectively overlapping the plurality of second reception pads in the thickness direction.

17. The display apparatus of claim 15, wherein the display panel further includes a pixel including a transistor including a source electrode and a gate electrode, wherein the wireless reception pad unit is disposed in the same layer as that in which the source electrode or the gate electrode of the transistor of the pixel is disposed.

18. A display apparatus comprising:
a printed circuit board including:
  a base circuit board; and
  a wireless transmission pad unit disposed on one of an upper surface and a lower surface of the base circuit board and comprising a plurality of first transmission pads and a plurality of second transmission pads, and
a display panel which is opposite to the printed circuit board and includes:
  a panel substrate including a display area which displays an image, and a first non-display area and a second non-display area spaced apart from the display area in a first direction and in a second direction different from the first direction, respectively;
  a wireless reception pad unit which is disposed on one of an upper surface and a lower surface of the panel substrate, overlaps the wireless transmission pad unit and includes a plurality of first reception pads disposed in the first non-display area and arranged in the second direction and a plurality of second reception pads disposed in the second non-display area and arranged in the first direction,
wherein the first transmission pads and the second transmission pads overlap the first reception pads and the second reception pads in a thickness direction, respectively.

19. The display apparatus of claim 18 wherein:
the printed circuit board further includes a circuit device disposed on one of the upper surface and the lower surface of the base circuit board, and
the display panel further includes a data driver disposed on one of the upper surface and the lower surface of the panel substrate.

* * * * *